United States Patent

Barton et al.

[15] 3,638,985
[45] Feb. 1, 1972

[54] ENERGY ABSORBING BUMPER

[72] Inventors: David W. Barton, Birmingham; George H. Muller, Ann Arbor, both of Mich.

[73] Assignee: Ford Motor Company, Dearborn, Mich.

[22] Filed: June 26, 1969

[21] Appl. No.: 836,895

[52] U.S. Cl. ...................293/71, 114/219, 293/99
[51] Int. Cl. .............................................B60r 19/08
[58] Field of Search.....................293/71; 114/219

[56] References Cited

UNITED STATES PATENTS

| | | | |
|---|---|---|---|
| 2,263,063 | 11/1941 | Allen | 52/717 |
| 2,910,033 | 10/1959 | Weisburg | 114/219 |
| 2,990,802 | 7/1961 | Ong et al. | 114/219 |

*Primary Examiner*—Arthur L. La Point
*Assistant Examiner*—Robert Saifer
*Attorney*—John R. Faulkner and E. Dennis O'Connor

[57] ABSTRACT

An energy adsorbing bumper particularly adapted to shield motor vehicle structural members from impact damage. The bumper includes a resiliently deformable, arcuate member secured to one of the structural members and defining therewith a chamber. Web means extend from the arcuate member and into the chamber. Initial collapse of the arcuate member as a whole due to an impart face is followed by a secondary collapse of the web means due to contact with the structural member, thereby providing for the adsorption of large amounts of impact energy. The connection between the arcuate and structural members is hidden from view by a flap integrally formed with and extending from the arcuate member.

4 Claims, 7 Drawing Figures

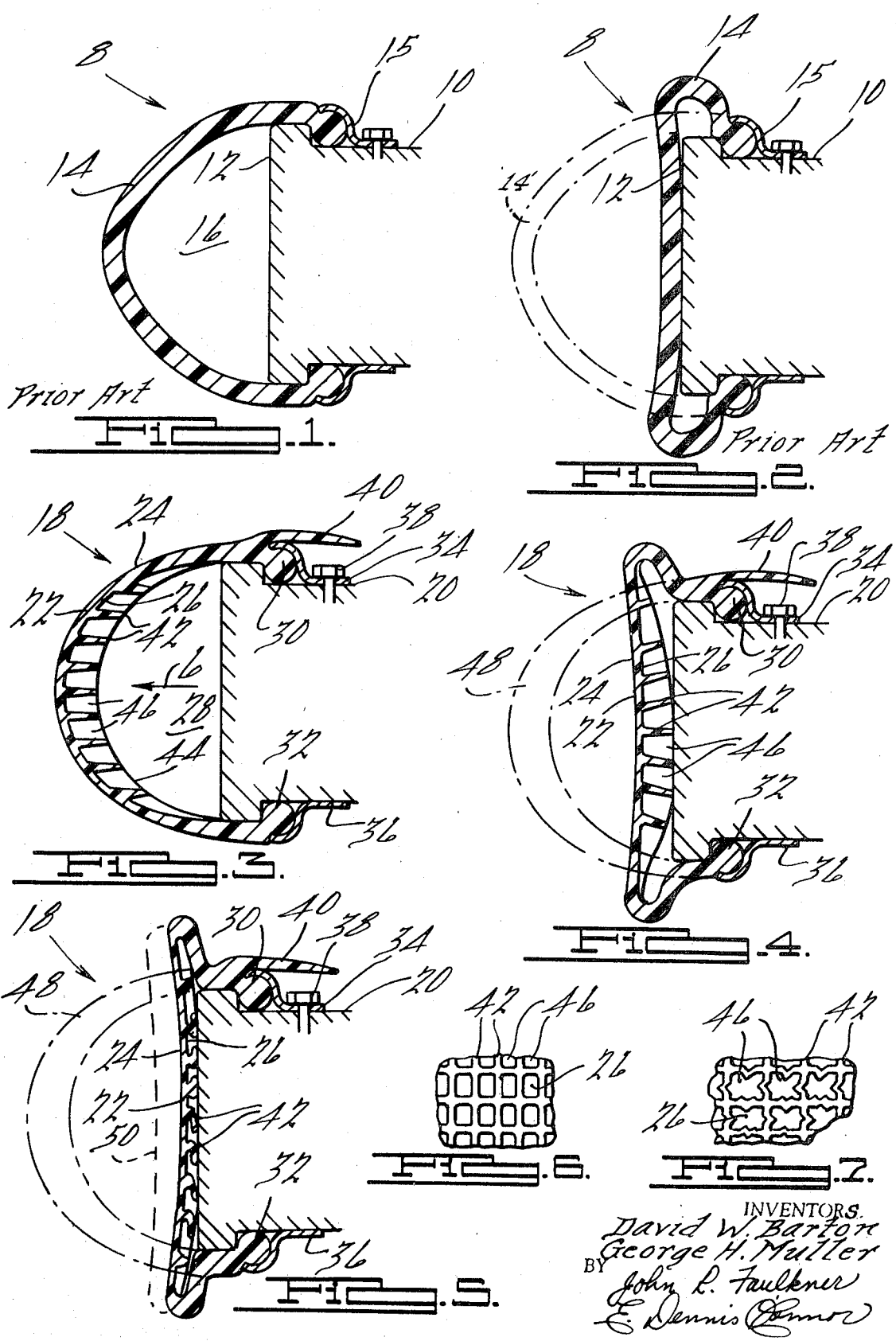

3,638,985

ENERGY ABSORBING BUMPER

BACKGROUND OF THE INVENTION

In the energy and shock absorption art, it is well detailed that flexible bumpers are useful to prevent damage caused by impact forces to structures mounting such bumpers. Many potential usages for such bumpers historically have appeared to be present in the motor vehicle art. The many low-speed yet damaging collisions to which motor vehicles are subjected under such conditions as parking and close quarter maneuvering are notorious. Commercial utilizations of the flexible bumper concept on motor vehicles, however, have been quite limited.

It is believed that there have been several impediments to the widespread commercial development of flexible, resiliently deformable bumpers—especially as applied to motor vehicles. It has been difficult to produce a flexible bumper at an economically feasible cost, which bumper is constructed of high-quality elastomeric material. Also, it has been difficult to design a flexible bumper of a physical size compatible with projected usages, but that has the capability of absorbing large quantities of impact energy. Furthermore, many prior art flexible bumpers have not been aesthetically pleasing to the eye.

It is an object of this invention to provide a flexible bumper that avoids the difficulties detailed above. This invention thus relates to a flexible bumper particularly adapted for inclusion on a motor vehicle and that may be simply and economically produced of high-quality elastomeric material. The flexible bumper of this invention is capable of absorbing large quantities of impact energy and yet may be produced to a size and shape allowing styling flexibility.

SUMMARY OF THE INVENTION

The energy absorbing bumper constructed in accordance with this invention is adapted to shield a structure against impact damage. This bumper includes an arcuate, elastomeric member secured to the structure to be protected. The elastomeric member has a convex outer surface and a concave inner surface and cooperates with the structure to define therebetween a chamber. Resiliently deformable web means extend from the inner surface of the elastomeric member and into the chamber. These web means are of a length such that the ends of the web means remote from the inner surface of the elastomeric member are spaced from the structure when the member is in an undeformed condition. Following a predetermined deformation of the elastomeric member toward the structure due to an impact against the outer surface of the elastomeric member, these web means ends contact and are deformed against the structure. The web means are formed in the shape of a grid and cooperate with the inner surface of the elastomeric member to define a plurality of cells. Each of the cells is open to the chamber, but otherwise is closed. The elastomeric member is U-shaped and has a bead formed at the end of at least one of its extremities. This bead is secured to the structure by clamp means. A shield element, integrally formed with the elastomeric member, extends therefrom and overlies the bead and clamp means to hide the bead and clamp means from view. This shield element is flexible to allow access to the clamp means.

DESCRIPTION OF THE DRAWING

FIG. 1 is a side elevation view, partially in section, of a conventional prior art bumper shown in the normal, undeformed condition;

FIG. 2 is a view similar to FIG. 1 but showing the prior art bumper in a deformed position;

FIG. 3 is a side elevation view, partially in section, of the flexible bumper of this invention shown in the normal, undeformed position;

FIG. 4 is a view similar to FIG. 3 but illustrating the bumper of this invention in a partially deformed position;

FIG. 5 is a view similar to FIG. 4 but showing the bumper of this invention in the fully deformed position;

FIG. 6 is a partial view taken along the line of sight illustrated by the arrow 6 of FIG. 3, and showing the bumper webbing in an undeformed condition; and FIG. 7 is a view similar to FIG. 6 but showing the bumper webbing in a deformed condition.

DETAILED DESCRIPTION OF THE INVENTION

Referring now in detail to the drawings and in particular to FIGS. 1 and 2 thereof, the numeral 8 denotes a conventional flexible bumper arrangement. A structural member 10, having a leading face 12 that is subject to impact, is adapted to be protected by an arcuate member 14 that is constructed from resiliently deformable, elastomeric material such as rubber or dense urethane foam. Member 14 is secured to the structural member 10 by mounting means 15, the details of which are unimportant to this description. The elastomeric member 14 and the leading edge 12 of structural member 10 cooperate to define a cavity 16 therebetween.

Upon being impacted, elastomeric member 14, having an undeformed shape as illustrated in FIG. 1, is deformed inwardly toward the surface 12. If the impact force causing this deformation is of sufficient magnitude, member 14 contacts surface 12 as illustrated in FIG. 2 so that subsequent deformation of and energy absorption by the elastomeric member are impossible.

It has been found that when an elastomeric member such as the member illustrated in FIGS. 1 and 2 is impacted and deformed, the greatest amount of impact energy is absorbed in the early stages of deformation. For example, in FIG. 2 the undeformed position of elastomeric member 14 is illustrated by the broken line 14'. The initial deformation of elastomeric member 14 from the position 14' would require a relatively large magnitude of impact energy to be expended. After this initial deformation was accomplished, further deformation of elastomeric member 14 could be accomplished with a relatively small expenditure of impact energy.

The flexible bumper arrangement 8 illustrated in FIGS. 1 and 2 is the type that is adapted for use on a motor vehicle. It readily may be appreciated that design and styling considerations greatly limit the possible numbers of shapes and sizes of such bumpers. Thus, if the prior art bumper of FIGS. 1 and 2 could be improved such that no greater amount of elastomeric material was used, but so that the improved bumper would absorb greater degrees of energy, the commercial potential of flexible bumpers would be increased. This invention is directed to the accomplishment of such an improvement.

The flexible bumper of this invention is illustrated in FIGS. 3, 4 and 5 and utilizes no greater amount of elastomeric material than does the prior art bumper of FIGS. 1 and 2, and yet is capable of absorbing greater amounts of impact energy. The flexible bumper arrangement of this invention is designated by the numeral 18. The numeral 20 designates structure adapted to be protected from impact forces. Structure 20 may be the structural member of a motor vehicle frame or the like.

The bumper includes an elastomeric shell 22 having a thickness that is considerably less than the thickness of the elastomeric member 14 of the bumper of FIGS. 1 and 2. Shell 22 has an outer convex surface 24 and an inner convex surface 26. Shell 22 and structure 20 cooperate to define therebetween a cavity 28.

The relative orientation between shell 22 and structure 20 is made possible by the attachment of the former to the latter. The attachment structure includes beads 30 and 32 integrally formed on the upper and lower extremities, respectively, of shell 22. A pair of Z-shaped clamps 34 and 36 engage beads 30 and 32 respectively. As illustrated, clamp 34 is secured to structure 20 by a fastener 38. Clamp 36 likewise is secured to structure 20, either by a fastener or by any other desired and suitable method.

It readily may be appreciated that members such as clamp 34 and fastener 38 are unsightly and aesthetically unpleasing on a motor vehicle body. Provision is made for hiding these unsightly members by the inclusion of an integrally formed, flexible flap or shield 40 that extends from shell 22. This shield overlies both the clamp and the fastener and hides these members from view. The flexibility of shield 40 allows access to fastener 38 and clamp 34 for such purposes as adjustment and/or removal of these members.

Extending from inner shell surface 26 into chamber 28 is integrally formed webbing 42. The end portions of webbing 42 form an arcuate profile 44 best seen in FIG. 3. Webbing 42 cooperates with inner shell surface 26 to define plural cells 46 that open into chamber 28, but otherwise are closed.

Referring now to FIG. 4 of the drawings wherein is illustrated the initial deformation mode of the flexible bumper of this invention when said bumper is subjected to an impact force, the numeral 48 denotes in broken lines the original configuration of the elastomeric shell 22. When the outer surface 24 of shell 22 is subjected to an impact force, the shell is deformed inwardly toward the structure 20. This deformation is sufficient to cause the end portions of webbing 42 to contact the face of structure 20 that partially define chamber 28. In some instances, this initial deformation illustrated in FIG. 4 will be the only deformation that occurs. It may be appreciated that a quantity of impact energy is absorbed during the deformation mode illustrated in FIG. 4.

Relatively large impact forces will cause a second deformation mode that is illustrated in FIG. 5. Continued deformation of shell 22 from the position shown in FIG. 4 causes a deformation of webbing 42 against the leading surface of structure 20. This may be appreciated by reference to FIG. 5 and the dotted line 50 that represents the position of shell 22 in FIG. 4. As may be seen from FIG. 7, the deformation of webbing 42 causes a deformation of each of the sidewalls of the plurality of open cells 46. This deformation of multiple cell sidewalls results in the elastomeric member having the capability of absorbing great quantities of impact energy.

Upon the cessation of the application of the impact force causing shell deformation to the position illustrated in FIG. 5, the resiliently deformable material from which the elastomeric shell 22 is formed will cause the shell to return to its original position as denoted by the broken lines 48 in FIGS. 4 and 5 and as illustrated in FIG. 3.

From the above description, it readily may be appreciated that the bumper of this invention, although capable of absorbing large amounts of impact energy, may be produced as economically, from a material cost standpoint, as conventional prior art flexible bumpers having a smaller energy-absorption capability. The characteristic of the bumper of this invention wherein it is deformed through two different modes, the second mode being a deformation of the walls of plural open cells 46, allows the relatively small amount of flexible material from which the bumper is formed to be used in the formation of a bumper capable of absorbing large amounts of impact energy. These characteristics of the bumper of this invention also allow a flexible bumper to be formed having great impact energy absorption capabilities without such a bumper being overly large and thereby inhibiting to designers and stylists. Also, the bumper of this invention is aesthetically pleasing in that the structural members that attach the flexible member to the structure to be protected are hidden from view due to the provision of the shield 40.

We claim:

1. In an energy absorbing bumper assembly adapted to shield a structure against impact damage, said bumper assembly including an arcuate elastomeric member secured to said structure and having a convex outer surface and a concave inner surface, said elastomeric member and said structure cooperating to define therebetween a cavity, the improvement comprising: resiliently deformable web means extending from the inner surface of said elastomeric member, said web means being of a length such that the ends of the web means remote from the inner surface of said elastomeric member are spaced from said structure when said member is in an undeformed condition, said ends of said web means contacting and being deformed against said structure upon a predetermined deformation of said member toward said structure, said web means being formed in the shape of a grid and cooperating with said inner surface to define a plurality of cells, each of said cells being open to said cavity and otherwise closed.

2. In an energy absorbing bumper assembly adapted to shield a structure against impact damage, said bumper assembly including an arcuate elastomeric member secured to said structure and having a convex outer surface and a concave inner surface, said elastomeric member and said structure cooperating to define therebetween a cavity, the improvement comprising: resiliently deformable web means extending from the inner surface of said elastomeric member, said web means being of a length such that the ends of the web means remote from the inner surface of said elastomeric member are spaced from said structure when said member is in an undeformed condition, said ends of said web means contacting and being deformed against said structure upon a predetermined deformation of said member toward said structure, the extremities of said web means remote from said inner surface defining a concave profile.

3. In a motor vehicle energy absorbing bumper assembly adapted to shield vehicle structure against damage caused by impact forces, said bumper assembly including a resiliently deformable arcuate member secured to said structure and defining therewith a chamber such that deformation of said bumper results in the absorption of a first quantity of impact energy, the improvement comprising: resiliently deformable web means extending from said member into said chamber, a predetermined deformation of said member being sufficient to cause contact between said web means and said structure and a deformation of said web means such that a second quantity of impact energy is absorbed, said web means being formed integrally with said member, the extremities of said web means remote from said member defining an arcuate profile.

4. In a motor vehicle energy absorbing bumper assembly adapted to shield vehicle structure against damage caused by impact forces, said bumper assembly including a resiliently deformable arcuate member secured to said structure and defining therewith a chamber such that deformation of said bumper results in the absorption of a first quantity of impact energy, the improvement comprising: resiliently deformable web means extending from said member into said chamber, a predetermined deformation of said member being sufficient to cause contact between said web means and said structure and a deformation of said web means such that a second quantity of impact energy is absorbed, said web means being formed in the shape of a grid and cooperating with said member to define a plurality of cells, each of said cells being open to said chamber.

* * * * *